United States Patent

Hupfield et al.

(10) Patent No.: US 6,346,593 B1
(45) Date of Patent: *Feb. 12, 2002

(54) POLYMERIZATION OF SILOXANES

(75) Inventors: Peter Hupfield, Carmarthen; Grainne Moloney, Penarth; Avril Surgenor, Cardiff; Richard Taylor, Barry, all of (GB)

(73) Assignee: Dow Corning Limited, Barry (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/458,249

(22) Filed: Dec. 9, 1999

(30) Foreign Application Priority Data

Dec. 9, 1998 (GB) ................................ 9827068

(51) Int. Cl.$^7$ ................................ C08G 77/08
(52) U.S. Cl. ............... 528/23; 528/21; 528/34; 528/37; 528/38
(58) Field of Search ............... 528/23, 21, 34, 528/37, 38

(56) References Cited

U.S. PATENT DOCUMENTS

| | | | |
|---|---|---|---|
| 3,580,939 A | 5/1971 | Ceyzeriat et al. | .... 260/448.2 N |
| 4,888,405 A | 12/1989 | Gamon et al. | ................ 528/23 |
| 5,391,675 A | * 2/1995 | Cray et al. | |
| 5,688,888 A | 11/1997 | Burkus et al. | ................ 528/22 |
| 5,883,215 A | * 3/1999 | Bischoff et al. | |
| 6,077,930 A | * 6/2000 | Nobori et al. | |

FOREIGN PATENT DOCUMENTS

| | | |
|---|---|---|
| EP | 575972 A2 | 6/1993 |
| EP | 860461 A2 | 8/1998 |

OTHER PUBLICATIONS

Reinhard Schwesinger, et al., "Extremely Strong, Uncharged Auxiliary Bases; Monomeric and Polymer–Supported Polyaminophosphazenes (P2–P5)", Liebigs Ann. 1996, pp. 1055–1081.

* cited by examiner

Primary Examiner—Robert Dawson
Assistant Examiner—Marc S. Zimmer
(74) Attorney, Agent, or Firm—Jennifer S. Warren

(57) ABSTRACT

A polymerization process comprising mixing siloxane polymers with organosilicon compounds having at least one silicon-bonded group $R^N$, which is a substituent comprising at least one amine group, and with a phosphazene base catalyst and allowing the siloxanes and organosilicon compounds to polymerize to form amino-functional polyorganosiloxane polymers is claimed. Preferably the phosphazene base is selected from the following formulae:

$$((R^1_2N)_3P=N-)_x(R^1_2N)_{3-x}P=NR^2;$$

$$\{((R^1_2N)_3P=N-)_x(R^1_2N)_{3-x}P-N(H)R^2\}^+\{A^-\}$$

$$\{((R^1_2N)_3P=N-)_y(R^1_2N)_{4-y}P\}^+\{A^-\}$$

or $$\{(R^1_2N)_3P=N-(P(NR^1_2)_2=N)_n-P^+(NR^1_2)_3\}\{A^-\}$$

in which $R^1$ is hydrogen or an optionally substituted hydrocarbon group, or in which two $R^1$ groups bonded to the same N atom may be linked to complete a heterocyclic ring, $R^2$ is hydrogen or an optionally substituted hydrocarbon group, x is 1, 2 or 3; y is 1, 2, 3 or 4, n is an integer with a value of from 1 to 10 and A is an anion.

16 Claims, No Drawings

POLYMERIZATION OF SILOXANES

FIELD OF THE INVENTION

This invention relates to the polymerisation of siloxanes catalyzed by certain phosphazene bases, and in particular to the formation of polymeric siloxanes having amino-functionality.

BACKGROUND OF THE INVENTION

In EP0860461-A, there is described a process for the ring-opening polymerization of cyclosiloxanes, which comprises contacting a cyclosiloxane with 1 to 500 ppm of a phosphazene base, by weight of cyclosiloxane, in the presence of water. In GB 2311994, there is described a method of effecting polycondensation which comprises contacting at a temperature of from 0 to 200° C. and a pressure up to 350 torr, a silanol-containing organosiloxane with an amount of a peralkylated phosphazene base which is effective for polycondensation of said organosiloxane. The preferred peralkylated phosphazene base has the formula

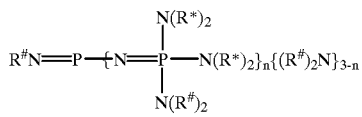

The prior art is useful for the manufacture of higher molecular weight polysiloxane materials with hydrocarbon or hydroxyl substituents. There is a need for making siloxane polymers which have other functionalities, and in particular amine functionality. It is particularly difficult to make amino-functional siloxanes by polymerization. An existing method uses equilibration of cyclic siloxanes with amino-functional silanes or siloxanes in the presence of strong base catalysts, such as potassium hydroxide or potassium silanolate, described in EP 575972. Alternatively, a condensation reaction is used starting from silanol-functional siloxane polymers in conjunction with amino-functional organosilicon compounds, e.g. silanes. This method is useful and effective in many ways, but slow, and often requires a complex catalyst system. Many catalytic systems are affected by the presence of amines, and are thus not suitable as a solution to the problem.

SUMMARY OF THE INVENTION

This invention is a polymerization process comprising mixing a siloxane polymer with an organosilicon compound having at least one silicon-bonded group $R^N$, which is a substituent comprising at least one amine group, with a phosphazene base catalyst and allowing the siloxane and organosilicon compound to polymerize to form amino-functional polyorganosiloxane polymers.

We have surprisingly found that phosphazene base materials are effective catalysts for polymerization of siloxanes in order to provide amino-functional siloxanes. They are furthermore found to be effective, whether they are used to make the amino-functional siloxanes via condensation or equilibration reaction, or even, if desired, by a combination of both reaction types.

DETAILED DESCRIPTION OF THE INVENTION

According to a first aspect of the invention there is provided a polymerization process comprising mixing certain siloxanes and organosilicon compounds having at least one silicon-bonded group $R^N$, which is a substituent comprising at least one amine group, with one or more phosphazene base catalysts and allowing the siloxanes and organosilicon compounds to polymerize to form amino-functional polyorganosiloxane polymers.

Phosphazene bases themselves are known to be extremely strong bases. Numerous phosphazene bases, some of which are ionic phosphazene bases and routes for their synthesis have been described in the literature, for example in Schwesinger et al., Liebigs Ann. 1996, 1055–1081.

Phosphazene bases are found to be a very powerful catalyst for polymerization of siloxane materials, and can therefore be present in a relatively low proportion, for example from 1 to 2000 ppm, preferably 2 to 1000 ppm by weight, based on the weight of siloxanes. The proportion of catalyst actually used will be selected depending on the speed of polymerization that is sought or on the size of polymer required.

A proportion of water may be present in the reaction, especially where the phosphazene used is a non-ionic phosphazene. Where this is the case, it is preferably at least 0.5, more preferably from 0.5–10 mols per mol of the ionic phosphazene base, most preferably from 1 to 10 mols per mol of ionic phosphazene base. It is possible to allow higher proportions of water, and this can have the benefit of enabling greater control over the polymerization reaction, as described in more detail below.

In principle, any phosphazene base is suitable for use in the present invention. Phosphazene bases generally include the following core structure P=N—P=N, in which free N valencies are linked to hydrogen, hydrocarbon, —P=N or =P—N, and free P valencies are linked to —N or =N. Some ionic phosphazene bases, for example 1-tert-Butyl-4,4,4-tris(dimethylamino)-2,2-bis{tris(dimethylamino)-phosphoranylidenamino}-2λ⁵, 4λ⁵-catenadi(phosphazene)}, are commercially available e.g. from Fluka Chemie AG, Switzerland. The ionic phosphazene bases preferably have at least 3 P-atoms. Some preferred phosphazene bases are of the following general formulae:

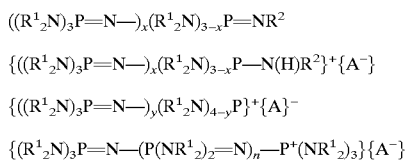

in which $R^1$, which may be the same or different in each position, is hydrogen or an optionally substituted hydrocarbon group, preferably a $C_1$–$C_4$ alkyl group, or in which two $R^1$ groups bonded to the same N atom may be linked to complete a heterocyclic ring, preferably a 5- or 6-membered ring; $R^2$ is hydrogen or an optionally substituted hydrocarbon group, preferably a $C_1$–$C_{20}$ alkyl group, more preferably a $C_1$–$C_{10}$ alkyl group; x is 1, 2 or 3, preferably 2 or 3; y is 1, 2, 3 or 4, preferably 2, 3 or 4; n is an integer with a value of from 1 to 10.and A is an anion, preferably fluoride, hydroxide, silanolate, alkoxide, carbonate or bicarbonate.

Particularly suitable compounds are those where $R^1$ is methyl, $R^2$ is tertiary butyl or tertiary octyl, x is 3, y is 4, n is 1 to 4 and A is fluoride or hydroxide. Suitable phosphazene base catalysts are commercially available, or can be made by a process disclosed by Schwesinger et al, as indicated above. The compounds of the formula $\{(R^1_2N)_3P=N—(P(NR^1_2)_2=N)_z—P^+(NR^1_2)_3\}\ \{A\}^-$ may be made by a method which comprises reacting a linear phosphonitrile halide compound, preferably chloride, with a compound selected from a secondary amine, a metal amide and a quaternary ammonium halide to form an aminated phosphazene material, followed by an ion exchange reaction replacing the anion with a nucleophile. Phosphonitrile halide compounds and methods of making them are well known in the art; for example, one particularly useful method includes the reaction of $PCl_5$ with $NH_4Cl$ in the presence of a suitable solvent. Secondary amines are the preferred reagent for reaction with the phosphonitrile halide, and a suitable secondary amine has the formula $R^3{}_2NH$, wherein $R^3$ is a hydrocarbon group having up to 10 carbon atoms, or both $R^3$ groups form a heterocyclic group with the nitrogen atom, for example a pyrollidine group, a pyrrole group or a pyridine group. Preferably, $R^3$ is a lower alkyl group, more preferably a methyl group, or both $R^3$ groups form a pyrollidine ring. Suitable preferred secondary amines include dimethylamine, diethylamine, dipropylamine and pyrollidine. Preferably the reaction is carried out in the presence of a material which is able to capture the exchanged halides, e.g. an amine such as triethylamine. The resulting by-product (e.g. triethyl ammonium chloride) can then be removed from the reaction mixture, e.g. by filtration. The reaction may be carried out in the presence of a suitable solvent for the phosphonitrile chloride and linear phosphazene base. Suitable solvents include aromatic solvents such as toluene. The linear phosphazene material which is formed this way can be passed through an ion exchange reaction (preferably an ion exchange resin) whereby the anion is replaced with a hard nucleophile, preferably hydroxyl or alkoxy, most preferably hydroxyl. The phosphazene is preferably dispersed in a suitable medium prior to passing through an ion exchange system. Suitable media include water, alcohol and mixtures thereof.

The polymerization can be carried out in bulk or in the presence of a solvent. Suitable solvents are liquid hydrocarbons or silicone fluids. The phosphazene base catalyst can be diluted in a hydrocarbon solvent, such as hexane, heptane or toluene, or dispersed in a silicone fluid such as polydiorganosiloxanes. Where the phosphazene base catalyst is initially in a solvent such as hexane, the hexane can be removed by evaporation under vacuum, and the catalyst dispersed in a silicone fluid to give a stable clear solution. When this silicone-dissolved catalyst is used for polymerization reactions, the catalyst disperses evenly and gives reproducible results. The catalyst can also be dissolved in water, and this has the advantage of moderating and enabling greater control over the polymerization reaction, as described below.

The polymerization reaction can be carried out under heating, for example to 100° C. or higher, which is appropriate when the catalyst activity has been moderated as described below. The method of the invention may conveniently be carried out at room temperature. The temperature may also be as high as 250° C. Preferably, however, the temperature range is from 20 to 170° C., most preferably from 50 to 170° C. The time taken for polymerization will depend on the activity of the catalyst in the chosen system, and on the desired polymer product. In the absence of moderation, the phosphazene base catalysts are sufficiently active to convert siloxanes to high molecular weight aminofunctional polysiloxane materials within a short time frame.

One of the starting materials for the condensation reaction is siloxane polymers having silicon-bonded hydroxyl groups or hydrolyzable groups such as alkoxy or aryloxy groups, which may form silanol groups in situ. These include, for example, organosiloxanes having the general formula (3):

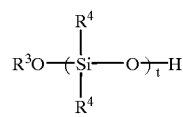
(3)

In formula (3), $R^3$ is as hydrogen or an alkyl or aryl group having up to 8 carbon atoms, each $R^4$ is the same or different and denotes a monovalent hydrocarbon group preferably having 1 to 18 carbon atoms or halogenated hydrocarbon group preferably having 1 to 18 carbon atoms and t is an integer having a value of from at least 2. Preferably $R^4$ denotes an alkyl group having from 1 to 6 carbon atoms and more preferably a methyl group. The value of t is preferably such that the average viscosity of the organosiloxanes does not exceed 200 mm²/s at 25° C.

Suitable organosiloxanes may have silicon-bonded R' groups, where R' is selected from a hydroxyl group and a hydrolyzable group, where the R' groups are in the polymer chain, but preferably the R' groups are present in end-groups. Organosiloxanes having terminal silicon-bonded hydroxyl groups are well known in the art and are commercially available. They can be made by techniques known in the art, for example, by hydrolysis of a chlorosilane, separation of the linear and cyclic material produced by the hydrolysis, and subsequently polymerizing the linear material. Preferably suitable organosiloxanes have one silicon-bonded hydroxyl group in each terminal group and have at least 80% of the $R^4$ groups denote a methyl group. Suitable organosiloxanes for use as reagents in a polymerization process in which the ionic phosphazene catalysts are used include organosiloxanes having terminal hydroxydiorganosiloxane units, e.g. hydroxyldimethyl siloxane end-blocked polydimethylsiloxanes, hydroxyldimethyl siloxane end-blocked polydimethyl poly-methylphenyl siloxane copolymers.

Another ingredient for the polymerization reaction by condensation is an amino-functional organosilicon compound, which has a silicon-bonded hydroxyl group or hydrolyzable group present. An example of a suitable organosilicon compound is a silane of the general formula $R^N$—$Si(R)_z$—$R'_{3-z}$, wherein $R^N$ and R' are as defined above, R denotes a hydrocarbon group having up to 20 carbon atoms and z has a value of 1 or 2. Another example is a siloxane having at least one silicon-bonded group R' and one silicon-bonded group $R^N$. Examples of suitable groups $R^N$ include —$(CH_2)_3NHC_6H_5$, —$(CH_2)_3NH_2$, —$CH_2.CH(CH_3)CH_2NH_2$, —$(CH_2)_3NH(CH_2)_2NH_2$, —$CH_2CH(CH_3)CH_2NH(CH_2)_2NH_2$,

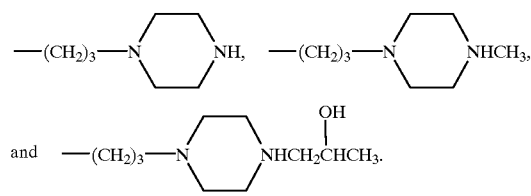

For the polymerization reaction which uses equilibration, cyclic or linear siloxanes which do not have the above mentioned silicon-substituted R' groups are suitable. Suitable cyclosiloxanes, also known as a cyclic siloxanes, are well known and commercially available materials. They have the general formula $(R^2{}_2SiO)_n$, wherein $R^2$ is as defined above, and preferably denotes hydrogen or an optionally substituted alkyl, alkenyl, aryl, alkaryl or aralkyl group having up to 8 carbon atoms, n denotes an integer with a value of from 3 to 12. $R^2$ can be substituted, e.g. by halogen such as fluorine or chlorine. The alkyl group can be, for example, methyl, ethyl, n-propyl, trifluoropropyl, n-butyl, sec-butyl, and tertiary-butyl. The alkenyl group can be, for example, vinyl, allyl, propenyl, butenyl and hexenyl. The aryl and aralkyl groups can be, for example, phenyl, tolyl, and benzoyl. The preferred groups are methyl, ethyl, phenyl, vinyl, and trifluoropropyl. Preferably at least 80% of all $R^2$ groups are methyl or phenyl groups, most preferably methyl. It is most preferred that substantially all $R^2$ groups are methyl groups. Preferably the value of n is from 3 to 6, most preferably 4 or 5. Examples of suitable cyclic siloxanes are octamethyl cyclotetrasiloxane, decamethyl cyclopentasiloxane, cyclopenta (methylvinyl) siloxane, cyclotetra (phenylmethyl) siloxane and cyclopenta methylhydrosiloxane. One particularly suitable commercially available material is a mixture of octamethylcyclotetrasiloxane and decamethylcyclopentasiloxane.

The starting material for equilibration polymerization can be instead of or in addition to cyclic siloxanes as described above, any organosiloxane material having units of the general formula $R^5_a SiO_{4-a/2}$ wherein $R^5$ denotes a hydrogen atom, a hydrocarbon group having from 1 to 18 carbon atoms, a substituted hydrocarbon group having from 1 to 18 carbon atoms or a hydrocarbonoxy group having up to 18 carbon atoms and a is as above defined but preferably has on average a value of from 1 to 3, preferably 1.8 to 2.2. Preferably the organosiloxanes are dialkylsiloxanes, and most preferably dimethylsiloxanes. They are preferably substantially linear materials, which are end-blocked with a siloxane group of the formula $R^5_3 SiO_{1/2}$, wherein $R^5$ is R'.

Sources for $R^N$ substituents for the polymers to be made by equilibration include cyclic siloxanes which have at least one $R^N$ substituent present on a silicon atom, linear siloxane materials which do not have a group R' linked to a silicon atom, but which do have at least one silicon-bonded $R^N$ group, preferably on a terminal silicon atom of the siloxane polymer.

It is even possible to provide the source of $R^N$ groups for the polymers to be made by the process of the present invention in so-called end-blockers. These may be used to control the chain length of any polymers made, and if they contain the $R^N$ group, they will be used at the same time to functionalize the polymers with an amine-containing substituent.

Suitable end-blockers for the equilibration polymers to be formed, include polysiloxanes in the molecular weight range from 160 upwards, in particular polydimethylsiloxanes of the general formula $MD_xM$ where M is trimethylsilyl, D is $-Si(CH_3)_2O-$ and x has a value of from 0 to 20. The end-blocker may have one or more functional groups such as hydroxyl, vinyl or hydrogen. Suitable ingredients for end-blocking when using a condensation reaction include short chain polymers e.g. organosiloxanes having only 1 group R' and R'Si containing silanes. In the absence of added end groups providing ingredients used in the process according to the invention, the molecular weight is determined by the catalyst concentration. An ingredient providing end-blocker groups may be added in a proportion calculated to produce a desired molecular weight of polymer. Water also acts as a end-blocker, with the introduction of hydroxyl functional groups.

We have also surprisingly found that phosphazene base materials are effective as catalysts for the combined polymerization via condensation and polymerization by equilibration, when carried out simultaneously. This is unexpected as there is usually a substantial difference in catalytic rate between both reactions. The speed of polymerization via equilibration seems normally to be substantially faster than for the condensation reaction described in this application. It was therefore surprising to find that the same catalyst can be used for combined polymerization via condensation and equilibration by mere mixture of the siloxane materials used for condensation polymerization, with cyclic siloxanes or certain linear siloxanes as described below, which are suitable for polymerization by equilibration. The combined reaction did not seem to favor one polymerization reaction to the detriment of the other.

By using a combination of condensation and equilibration reactions, it is possible to arrange the reagent mixture in a way to control the end-product, for example by controlling the amount and type of ingredients which are used to cause end-blocking, by varying the ratio of siloxanes which polymerize via condensation to siloxanes which polymerize via equilibration.

Thus the process according to the invention will be useful for making amino-functional polyorganosiloxanes having at least one silicon-bonded group $R^N$ and having units of the general formula $R''_a SiO_{4-a/2}$ (2) wherein R'' is hydroxyl or a hydrocarbon and a has a value of from 0 to 3. Preferably at least 80% of all R'' groups are alkyl or aryl groups, more preferably methyl groups. Most preferably substantially all R'' groups are alkyl or aryl groups, especially methyl groups. The polyorganosiloxanes are preferably those in which the value of a is 2 for practically all units, except for the end-blocking units, and the siloxanes are substantially linear polymers of the general formula $R''(R''_2 SiO)_p SiR''_3$. (3) wherein R'' is as defined above and p is an integer. It is, however, also possible that small amounts of units wherein the value of a denotes 0 or 1 are present. Polymers with such units in the chain would have a small amount of branching present. Preferably R'' denotes a hydroxyl group or an alkyl or aryl group, e.g. methyl or phenyl. The viscosity of the polyorganosiloxanes which may be produced by the process using a catalyst according to the present invention may be in the range of from 1000 to many millions $mm^2/s$ at 25° C., depending on the reaction conditions and raw materials used in the method of the invention.

The process according to the invention can be used to make a whole range of amino-functional polyorganosiloxanes, including liquid polymers and gums of high molecular weight, for example from $1 \times 10^6$ to $100 \times 10^6$ amu. The molecular weight of polyorganosiloxanes is effected by the concentration of materials used in the reaction, which will provide end groups. The catalyst used in the present invention has sufficient activity to enable the formation of polymers in a reasonable time at a low catalyst concentration.

When the desired polymer has been formed, it is usually desirable to neutralize the catalyst to stabilize the product and prevent any further reaction. Suitable neutralizing agents are acids such as acetic acid, silyl phosphate, polyacrylic acid chlorine substituted silanes, silyl phosphonate or carbon dioxide.

We have found that air reacts very rapidly with the catalyst solutions giving a hazy material which eventually leads to an insoluble liquid phase. This is believed to be due to the reaction of the catalyst with $CO_2$ to form a carbonate salt. We have also found that this deactivation of the catalyst can be reversed e.g. by heating, purging with inert gas or subjecting the mixture to reduced pressure. This makes it possible to moderate or control the polymerization reaction.

This is particularly advantageous in view of the very rapid reaction which occurs when the catalyst is not moderated. Because of the low levels of catalyst employed in these reactions (which can be as low as 100 to 2000 ppm), the reaction with $CO_2$ needs to be taken into account to control the reaction and obtain reproducible results. By dissolving the phosphazene base in water, in which it is very soluble and very stable, the catalyst activity becomes much more controllable and the polymers produced are of lower molecular weight. This is caused by the water acting as a catalyst inhibitor and also as an end-blocker. The inhibiting effect of the water can be reduced by reducing the amount of water present e.g. by heating. At temperatures below 100° C. the rate of polymerization is relatively slow in the presence of water and/or $CO_2$, for example taking up to more than 24 hours to reach gum viscosity. At temperatures above 100° C. (e.g. 100–150° C.), polymerization becomes much faster, for example taking up to 5–60 minutes to reach gum viscosity. Such control of the reaction can also be achieved if the water is mixed with or replaced by alcohol (e.g. $C_1$–$C_6$ alcohols such as methanol or ethanol).

We have also found that polymerization can be prevented by exposing a mixture of siloxanes and phosphazene base catalyst to air and/or $CO_2$ or larger amounts of water. The polymerization can then be initiated ("command polymerization") simply by removing the air and/or $CO_2$ or water e.g. by heating the mixture (e.g. to 100° C. to 170° C. for a few minutes). A D4 catalyst mixture (2 to 50 ppm of catalyst) is stable in air at 20° C. for extended periods (up to 7 days).

EXAMPLES

The following Examples illustrate the invention. Unless stated otherwise, all parts and percentages are by weight and viscosity is given at 25° C.

Examples 1 to 8 x g. of Octamethylcyclotetrasiloxane, y g. of N-(3-(dimethoxymethylsilyl)-2-methylpropyl)-1,2-ethanediamine containing dimethylsiloxane material, and z g. of trimethylsiloxy end-blocked polydimethylsiloxane with a viscosity of $\eta$ mm$^2$/s, were heated to t° C. under a nitrogen atmosphere (N) or under reduced pressure of n mbar. At temperature t, m ppm of 1-tert-Butyl-4,4,4-tris(dimethylamino)-2,2-bis{tris(dimethylamino)-phosphoranylidenamino}-2$\lambda^5$, 4$\lambda^5$-catenadi(phosphazene)} based on the total weight were added with agitation, resulting in an immediate increase in viscosity. After 1 hour the reaction was allowed to cool to approx. 80° C. and neutralization agent bis(dimethylvinylsilyl)vinyl phosphonate was added. The reaction product was an amino-functional polymer with a viscosity of final $\eta$ mm$^2$/s (in the case of Example 8, this was measured after stripping the product under vacuum) and a non-volatile content of NVC %. Details of x, y, z, $\eta$, n, m, t, final $\eta$ and NVC are given in table 1.

TABLE 1

| Example | x | y | z | $\eta$ | t° C. | n | m | Final $\eta$ | NVC |
|---|---|---|---|---|---|---|---|---|---|
| 1 | 94.1 | 3.90 | 2.57 | 50 | 150 | N | 500 | 493000 | 87.8 |
| 2 | 93.6 | 3.90 | 2.68 | 50 | 100 | 400 | 500 | 42650 | 88.1 |
| 3 | 94.3 | 5.40 | 0.60 | 1 | 150 | N | 625 | 5490 | 86.3 |
| 4 | 94.3 | 5.30 | 0.66 | 1 | 100 | 400 | 750 | 2406 | 87.3 |
| 5 | 94.5 | 5.37 | 0.62 | 1 | 130 | 400 | 625 | 3710 | 87.0 |
| 6 | 90.9 | 9.50 | 0.50 | 1 | 100 | 200 | 950 | 14297 | 86.9 |
| 7 | 94.4 | 4.20 | 1.50 | 50 | 100 | 200 | 875 | 763709 | 90.3 |
| 8 | 97.3 | 2.37 | 0.45 | 5 | 130 | 400 | 250 | 701862 | 96.3 |

Example 9

A 50/50 mixture of linear polydimethylsiloxane, having a viscosity of about 60 mm$^2$/s and cyclic polydimethylsiloxanes (89.1 g), trimethylsiloxy end-blocked polydimethylsiloxane having a viscosity of 5 mm$^2$/s (8.3 g), aminoethyl aminobutylmethyldimethoxy silane, (6.04 g) and water (0.44 g) were stirred for 1 hour. The mixture was then heated to 130° C. at a pressure of 400 mbar. Phosphazene base catalyst as used in Example 1 (500 ppm) was added at that temperature. After 4 hours the product had a viscosity of 292 mm$^2$/s and a non-volatile content of 86.9%.

Example 10

The reaction of Example 9 was repeated, using instead of the catalyst of Example 1, 750 ppm of 1,1,1,3,3,5,5,5-octapyrollidium phosphonitrile hydroxide catalyst at a temperature of 150° C. and a pressure of 250 mbar. After 120 minutes the product had a viscosity of 203 mm$^2$/s and a non-volatile content of 88%.

Example 11

(A) Synthesis of Linear Polyaminophosphazenium Hydroxide

Toluene and a linear phosphonitrilic chloride ($Cl_3P=N-(P=NCl_2)_{1.8}-PCl_3)^+(PCl6)^-$ (0.023 moles) were charged to a three necked flask fitted with a thermometer, condenser and dropping funnel. The reaction mixture was allowed to cool to −50° C. and a mixture of triethylamine and pyrollidine (0.28 moles each) was added dropwise. The reaction mixture was then allowed to warm to room temperature upon which it was heated to approximately 60° C. for up to 40 hours. The orange solution was filtered to remove triethylammonium chloride and then washed with toluene. The toluene was then removed under reduced pressure to yield an orange oil. The oil was then dispersed in distilled water and methanol (1:1) and passed through a basic (OH$^-$) anion exchange resin. The water and methanol were then removed under reduced pressure to yield a basic oil in approximately 90% yield. This comprised $(Py_3P=N-(P(Py)_2=N)_{1.8}-PPy_3)^+OH^-$, where Py represents pyrrolidine.

(B) Polymerization

The reaction of Example 10 was repeated, except that 750 ppm of the linear phosphazenium hydroxide catalyst prepared above was used. The resulting polymer had a viscosity of 200 mm$^2$/s and a non-volatile content of 88.4%.

Example 12

A linear polydimethyl, methyl(aminoethylaminoisobutyl) siloxane (5 g) was mixed with phosphazene base catalyst of Example 1 (100 ppm), followed by addition of cyclodimethylsiloxane (95 g). The mixture was heated to 100° C. in air. A gum was formed after 15 minutes.

Example 13

A linear polydimethyl, methyl(aminoethylaminoisobutyl) siloxane (5 g) and octamethylcyclotetrasiloxane (95 g) were heated to 130° C. under a pressure of 400 mbar. The linear phosphazenium hydroxide catalyst of Example 11 (100 ppm) was added and a high viscosity gum (having a viscosity in excess of 1,000 Pa·s) was formed in less than 5 minutes. The reaction mixture was allowed to cool before neutralization.

Example 14

(A)Synthesis of 1,1,1,3,3,5,5,5-octapyrollidinium phosphazenium hydroxide $Cl_3PNPCl_2O$ (0.092 moles) and $(Cl_3PNPCl_3)^+(PCl_6)^-$ (0.092 moles) were charged to a three necked flask fitted with stirrer, thermometer and condenser. To this was added 1,2,4-trichlorobenzene and the mixture was heated to 195° C. for up to 30 hours. The crude product was dissolved in tetra-chloroethane and precipitated by repeat additions of carbon tetrachloride. A white crystalline product was formed, which was then washed with petroleum ether and dried under vacuum (65% yield). Conversion to the phosphazenium hydroxide was carried out by dispersing the crystalline material in distilled water and methanol (1:1) and passing it through a basic (OH⁻) anion exchange resin. The water and methanol were then removed under reduced pressure.

A linear polydimethyl, methyl(aminoethylaminoisobutyl) siloxane (5.1 g) and octamethylcyclotetrasiloxane (95 g) were heated to 130° C. under a pressure of 400 mbar. 1,1,1,3,3,5,5,5-octapyrollidinium phosphonitrile hydroxide catalyst (100 ppm) was added and a high viscosity gum (approx. 1,000 Pa·s) was formed in less than 5 minutes. The reaction mixture was allowed to cool before neutralization.

Example 15

Silanol end-blocked polydimethylsiloxane polymers having a viscosity of 60 mm²/s (95.84 g) were heated to 85° C. at which temperature aminoethyl-aminoisobutyl-methyldimethoxy silane (0.8 g), a mixture of $C_{13}$ and $C_{15}$ alcohols (3.31 g) and a phosphazene base catalyst as used in Example 1 (500 ppm) were added. The mixture was refluxed for 2 hours before the pressure was reduced to 200 mbar. The viscosity was monitored and the reaction was stopped when it reached approx. 1000 mm²/s. The resulting polymer was an amino-functional polysiloxane.

Example 16

Silanol end-blocked polydimethylsiloxane polymers having a viscosity of 60 mm²/s (96.06 g) were heated to 85° C. at which temperature aminopropylmethyl diethoxy silane (3.91 g) and phosphazene base catalyst as used in Example 1 (167 ppm) were added. The reaction was completed as in Example 14 to give a final viscosity of approx. 1000 mm²/s before neutralizing. The final product had a non-volatile content of 88%.

Example 17

Silanol end-blocked polydimethylsiloxanes having a viscosity of 60 mm²/s (194.1 g) were mixed with gamma-piperazinopropyl methyl dimethoxy silane (5.88 g) and heated to 85° C. at which temperature 0.2 g tetrakis{tris(dimethylamino)phosphoranylidenamino}phosphonium hydroxide in 0.5 ml methanol was added. The reaction was heated at reflux for 3 hours then vacuum stripped and allowed to cool, forming an aminosiloxane of viscosity 4000 mm²/s.

Example 18

Silanol end-blocked polydimethylsiloxanes having a viscosity of 60 mm²/s (193.3 g) were mixed with gamma-anilinopropyl trimethoxy silane (6.70 g) and heated to 85° C. at which temperature 0.9 ml tetrakis{tris(dimethylamino)phosphoranylidenamino}phosphonium fluoride was added. The resulting aminofunctional polysiloxane had a viscosity in excess of 25,000 mm2/s after one hour.

That which is claimed is:

1. A polymerization process comprising mixing a siloxane polymer with an organosilicon compound having at least one silicon-bonded group $R^N$, which is a substituent comprising at least one amine group, with a phosphazene base catalyst and allowing the siloxane and organosilicon compound to polymerize in the presence of a solvent selected from liquid hydrocarbons and silicone fluids, to form aminofunctional polyorganosiloxane polymers, wherein water is present in the reaction, in an amount of from 0.5–10 mols per mol of the phosphazene base.

2. A process according to claim 1, wherein the phosphazene base is selected from the following general formulae:

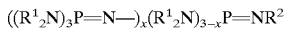

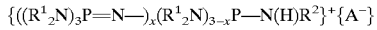

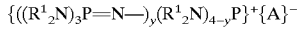

or

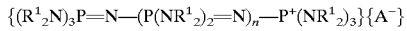

in which each $R^1$ is selected from hydrogen, a hydrocarbon group and a substituted hydrocarbon group, or in which two $R^1$ groups bonded to the same N atom are linked to complete a heterocyclic ring, $R^2$ is selected from hydrogen, a hydrocarbon group and a substituted hydrocarbon group, x is 1 to 3; y is 1 to 4, n is from 1 to 10 and A is an anion.

3. A process according to claim 2, wherein anion A is selected from fluoride, hydroxide, silanolate, alkoxide, carbonate and bicarbonate.

4. A process according to claim 1, wherein the polymerization is carried out at a temperature of from 20 to 170° C.

5. A process according to claim 1, wherein the siloxane polymer comprises a siloxane polymer having silicon-bonded groups R', wherein R' is selected from a hydroxyl group and a hydrolyzable group.

6. A process according to claim 5 wherein the siloxane polymer having groups R' is an organosiloxane having the general formula

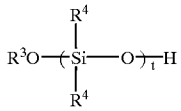

wherein $R^3$ is selected from hydrogen and alkyl and aryl groups having up to 8 carbon atoms, each $R^4$ is selected from monovalent hydrocarbon groups having 1 to 18 carbon atoms and halogenated hydrocarbon groups having 1 to 18 carbon atoms and t has a value of at least 2.

7. A process according to claim 1, wherein the siloxane polymer comprises a cyclic or linear siloxane which does not have a silicon bonded hydroxyl or hydrolyzable group.

8. A process according to claim 7, comprising mixing a siloxane having silicon-bonded groups R' and a cyclic or linear siloxane having no silicon-bonded groups R' with an organosilicon compound having a silicon-bonded group $R^N$ and with a phosphazene base catalyst and allowing the siloxane having silicon-bonded groups R' to condense and the cyclic or linear siloxane having no silicon-bonded R' groups to polymerize by equilibration in the presence of the organosilicon compound having at least one silicon-bonded group $R^N$ so that the silicon-bonded group RN is incorporated in the resulting polymer.

9. A process according to claim 7, wherein the cyclic siloxane has the general formula $(R^2{}_2SiO)_n$, wherein $R^2$ is selected from hydrogen, a hydrocarbon group or a substituted hydrocarbon group and n is 3 to 12.

10. A process according to claim 7, wherein the linear siloxane having no silicon-bonded R' groups comprises siloxane units of the general formula $R^5{}_a SiO_{4-a/2}$ wherein $R^5$ is selected from hydrogen, hydrocarbon groups having 1 to 18 carbon atoms, substituted hydrocarbon groups having 1 to 18 carbon atoms and hydrocarbonoxy groups having 1 to 18 carbon atoms and a has a value from 0 to 3.

11. A process according to claim 7, wherein the polymerization is carried out in the presence of an end-blocker which is selected from polydimethylsiloxanes of the general formula $MD_xM$ where M is trimethylsilyl, D is —Si(CH$_3$)$_2$O— and x has a value of from 0 to 20, siloxane polymers having up to 25 silicon atoms and having only one silicon-bonded group R' and silanes containing a silicon-bonded group R', where R' is selected from hydroxyl and hydrolyzable groups.

12. A process according to claim 1 further comprising the step of neutralizing the catalyst when the desired polymer has been made by adding an acid, selected from acetic acid, silyl phosphate, polyacrylic acid, chlorine substituted silanes, silyl phosphonate and carbon dioxide.

13. A process according to claim 1, wherein the organosilicon compound having at least one silicon-bonded $R^N$ group is selected from siloxane polymers and silanes which also contain a silicon-bonded group R', where R' is selected from hydroxyl and hydrolyzable groups.

14. A process according to claim 13, wherein the organosilicon compound having at least one $R^N$ group is a silane of the general formula $R^N$—Si(R)$_z$R'$_{3-z}$, wherein R denotes a hydrocarbon group having 1 to 20 carbon atoms and z is 1 or 2.

15. A process according to claim 1, wherein the organosilicon compound having at least one silicon-bonded RN group is selected from cyclic siloxanes and linear siloxanes, said siloxanes having no hydroxyl or hydrolyzable group linked to silicon.

16. A process according to claim 1, wherein $R^N$ is selected from the group consisting of —(CH$_2$)$_3$NH$_2$, —H$_2$CH(CH$_3$)CH$_2$NH$_2$, —(CH$_2$)$_3$NH(CH$_2$)$_2$NH$_2$, —(CH$_2$)$_3$NHC$_6$H$_5$, —CH$_2$.CH(CH$_3$)CH$_2$NH(CH$_2$)$_2$NH$_2$

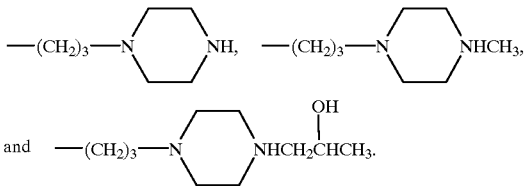

* * * * *